(12) United States Patent
Rusanovskyy et al.

(10) Patent No.: US 11,064,196 B2
(45) Date of Patent: Jul. 13, 2021

(54) PARAMETRIZABLE, QUANTIZATION-NOISE AWARE BILATERAL FILTER FOR VIDEO CODING

(71) Applicant: QUALCOMM Incorporated, San Diego, CA (US)

(72) Inventors: Dmytro Rusanovskyy, San Diego, CA (US); Nikolay Mikhaylovich Shlyakhov, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/557,471

(22) Filed: Aug. 30, 2019

(65) Prior Publication Data
US 2020/0077091 A1    Mar. 5, 2020

Related U.S. Application Data

(60) Provisional application No. 62/726,380, filed on Sep. 3, 2018, provisional application No. 62/727,487, filed on Sep. 5, 2018, provisional application No. 62/732,471, filed on Sep. 17, 2018.

(51) Int. Cl.
| | |
|---|---|
| *H04N 19/117* | (2014.01) |
| *H04N 19/136* | (2014.01) |
| *H04N 19/82* | (2014.01) |
| *H04N 19/96* | (2014.01) |
| *H04N 19/159* | (2014.01) |

(52) U.S. Cl.
CPC ......... *H04N 19/117* (2014.11); *H04N 19/136* (2014.11); *H04N 19/159* (2014.11); *H04N 19/82* (2014.11); *H04N 19/96* (2014.11)

(58) Field of Classification Search
None
See application file for complete search history.

(56) References Cited

U.S. PATENT DOCUMENTS

| | | | |
|---|---|---|---|
| 2016/0267660 A1* | 9/2016 | Vivet | G06T 7/32 |
| 2019/0058881 A1* | 2/2019 | Seo | H04N 19/119 |

OTHER PUBLICATIONS

Strom et al., "AHG 2 related: Reduced complexity bilater filter", Joint Video Experts Team (JVET) of ITU-T SG 16 WP 3 and ISO/IEC JTC 1/SC 29/WG 11, JVET-K0274-v3, 11th Meeting: Ljubljana, SI, Jul. 10-18, 2018.*
Durand F., et al., "Fast Bilateral Filtering for the Display of High-Dynamic Range Images," ACM Transactions on Graphics, Special Issue on Proc. of ACM Sig-Graph, 2002, San Antonio, Texas, vol. 21 (3), 10 pages.

(Continued)

*Primary Examiner* — Edemio Navas, Jr.

(57) ABSTRACT

Embodiments includes systems, methods and devices for encoding and decoding video data. For example, a video encoder or decoder may be configured to apply a bilateral filter to a sample of a reconstructed transform block. The bilateral filter may be defined as a piece-wise parameterizable function for generating filter weights.

20 Claims, 9 Drawing Sheets

(56) References Cited

OTHER PUBLICATIONS

Gadde A., et al., "CE2. 1 .3: In-Loop Bilateral Filter," 11th Meeting; Ljubljana, SI; Jul. 10-18, 2018, Joint Collaborative Team on Video Coding (JCT-VC) of ITU-T SG 16 WP 3 and ISO/IEC JTC 1/SC 29/WG 1, No. JVET-K0384_v2, 5 pp, Retrieved from the Internet: URL: http://phenix.int-evry.fr/jvet/doc_end_user/documents/11_Ljubljana/wg11/JVET-K0384-v5.zipJVET-K0384-v3-clean.docx [retrieved on Jul. 11, 2018] section 1 Introduction Section 2 Technology description Section 3 Storage and Complexity.

International Search Report and Written Opinion—PCT/US2019/049292—ISA/EPO—dated Nov. 21, 2019.

Li G., et al.,"Simplified Bilateral Intra Smoothing Filter", 6. JCT-VC Meeting; 97, MPEG Meeting; Jul. 14, 2011-Jul. 22, 2011; Torino; (Joint Collaborative Team on Video Coding of ISO/IEC JTC1/SC29/WG11 and ITU-T SG. 16); URL: http://wftp3.itu.int/av-arch/jctvc-site/, No. JCTVC-F528, Jul. 15, 2011 (Jul. 15, 2011), XP030009551.

Rusanovskyy (QUALCOMM) D., et al: "CE14: Test on in-loop Bilateral Filter from JVET-J0021/JVET-K0384 with Parametrization (CE14.2)", 12. JVET Meeting: 20481003-20181012; Macao; (The Joint Video Exploration Team of ISO/IEC JTC1/SC29/WG11 and ITU-T SG.16), No. JVET-L0406, Sep. 25, 2018, XP030193907, 8 pages, Retrieved from the Internet: URL: http://phenix.int-evry.fr/jvet/doc_end_user/documents/12_Macao/wg11/JVET-L0406-v1.zipJVET-L0406_CE14.2.docx [retrieved on Sep. 25, 2018] section 2 proposed technology.

Strom (Ericsson) J., et al: "CE14: Reduced Latency, LUT-free Bilateral Filter", 124. MPEG Meeting; Oct. 8, 2018-Oct. 12, 2018; MACAO; (Motion Picture Expert Group or ISO/IEC JTC1/SC29/WG11), No. m44192, Sep. 25, 2018, XP030190945, 14 Pages, Retrieved from the Internet: URL: http://phenix.int-evry.fr/mpeg/doc_end_user/documents/124_Macao/wg11/m44192-JVET-L0172-v1-JVET-L0172.zip JVET-L0172.docx [retrieved on Sep. 25, 2018] section 2 removal of the look-up table section 3 calculation of the distance factors.

Strom (Ericsson) J., et al: "CE2 Related: Reduced Complexity Bilateral Filter", 123. MPEG Meeting; Jul. 16, 2018-Jul. 20, 2018; Ljubljana; (Motion Picture Expert Group or ISO/IEC JTC1/SC29/WG11), No. m43205, Jul. 15, 2018, XP030197313, 12 Pages, Retrieved from the Internet: URL: http://phenix.int-evry.fr/mpeg/doc_end_user/documents/123_Ljubljana/wg11/m43205-JVET-K0274-v4-JVET-K0274.zip JVET-K0274_v3_clean_version.docx [retrieved on Jul. 15, 2018] section 2 structure of the LUT Section 3 Intra filtering section 4 Inter filtering.

\* cited by examiner

PARAMETRIZABLE, QUANTIZATION-NOISE AWARE BILATERAL FILTER FOR VIDEO CODING

This application claims the benefit of U.S. Provisional Application No. 62/726,380, filed Sep. 3, 2018; U.S. Provisional Application No. 62/727,487, filed Sep. 5, 2018; and U.S. Provisional Application No. 62/732,471, filed Sep. 17, 2018, each of which is hereby incorporated by reference in its entirety.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for defining a filter for filtering pictures, including a sequence of pictures such as in video. For example, a video encoder or decoder may be configured to apply a bilateral filter to a sample of a reconstructed transform block. The bilateral filter may be defined as a piece-wise parameterizable function for generating filter weights that lowers storage costs relative to other implementations. In some embodiments, the function may be parameterized based on quantization parameter and coding mode. The function may be implemented using one or more pivot points stored on the device. Embodiments include filters for use in a post-processing stage, for in-loop coding, or for filtering in the prediction phase. It may be applied to any of the existing video codecs or be included as an efficient coding tool in any future video coding standards.

One embodiment includes a method of coding video data. The method includes reconstructing a transform block of the video data and applying a bilateral filter to a sample of the transform block using one or more neighboring samples. Applying the filter includes, for each of the one or more neighboring samples determining a difference value between the sample and each of the one or more neighboring samples, determining one of a plurality of value ranges based on a right arithmetical shift of the difference value by a predefined number of bits, and determining one of a plurality of weighting parameters based on the one of the plurality of value ranges, generating a weight based on the determined weighting parameter, a quantization parameter associated with the transform block, and a coding mode associated with the transform block. The method further includes applying the bilateral filter to the sample based on the weight generated for each of the one or more neighboring samples.

Another embodiment includes a device for coding video data. The device includes a memory configured to store video data and one or more processors implemented in circuitry. The one or more processors are configured to reconstruct a transform block of the video data and apply a bilateral filter to a sample of the transform block using one or more neighboring samples. The one or more processors for each of the one or more neighboring samples are further configured to determine a difference value between the sample and each of the one or more neighboring samples determine one of a plurality of value ranges based on a right arithmetical shift of the difference value by a predefined number of bits, determine one of a plurality of weighting parameters based on the one of the plurality of value ranges, generate a weight based on the determined weighting parameter, a quantization parameter associated with the transform block, and a coding mode associated with the transform block, apply the bilateral filter to the sample based on the weight generated for each of the one or more neighboring samples.

Another embodiment includes a device for coding video data. The device includes means for storing video data and means for processing the video data. The means for processing the video data includes means for reconstructing a transform block of the video data and means for applying a bilateral filter to a sample of the transform block using one or more neighboring samples. The means for applying the bilateral filter further include means for determining a difference value between the sample and each of the one or more neighboring samples, means for determining one of a plurality of value ranges based on a right arithmetical shift of the difference value by a predefined number of bits, means for determining one of a plurality of weighting parameters based on the one of the plurality of value ranges, means for generating a weight based on the determined weighting parameter, a quantization parameter associated with the transform block, and a coding mode associated with the transform block, and means for applying the bilateral filter to the sample based on the weight generated for each of the one or more neighboring samples.

DETAILED DESCRIPTION

Prior video codecs such as HEVC use a variety of filters as part of coding tools. HEVC also includes a deblocking filter and a technique called Sample Adaptive Offset (SAO). The concept of SAO is to reduce mean sample distortion of a region by first classifying the region samples into multiple categories with a selected classifier, obtaining an offset for each category, and then adding the offset to each sample of the category, where the classifier index and the offsets of the region are coded in the bitstream. In HEVC, the region (the unit for SAO parameters signaling) is defined to be a coding tree unit (CTU).

Bilateral filtering, which may be used as an in-loop coding tool, was proposed to avoid undesirable over-smoothing for pixels in the edge. As described further below, bilateral filtering uses a weighting of neighboring samples that takes the pixel values themselves into account to weight more those pixels with similar luminance or chrominance values. As also further noted below, existing bilateral filtering techniques have high memory requirements and do not utilize a priori information about a block.

Embodiments described herein may include a weighting function w(x) of a bilateral filter is defined by a limited set of parameters {Si} (smaller number of parameters than length of a look-up table (LUT) definition implementation) defining and a derivation process converting the parameters to entries of LUT. In some embodiments, a weighting function w(x) associated with the k-th neighboring sample is adjusted by a reliability cost $Reliability_k(x)$ associated with the spatial location (within a current block) of the sample k. Numerous examples are disclosed herein after first introducing further context for those examples.

Figure 1:
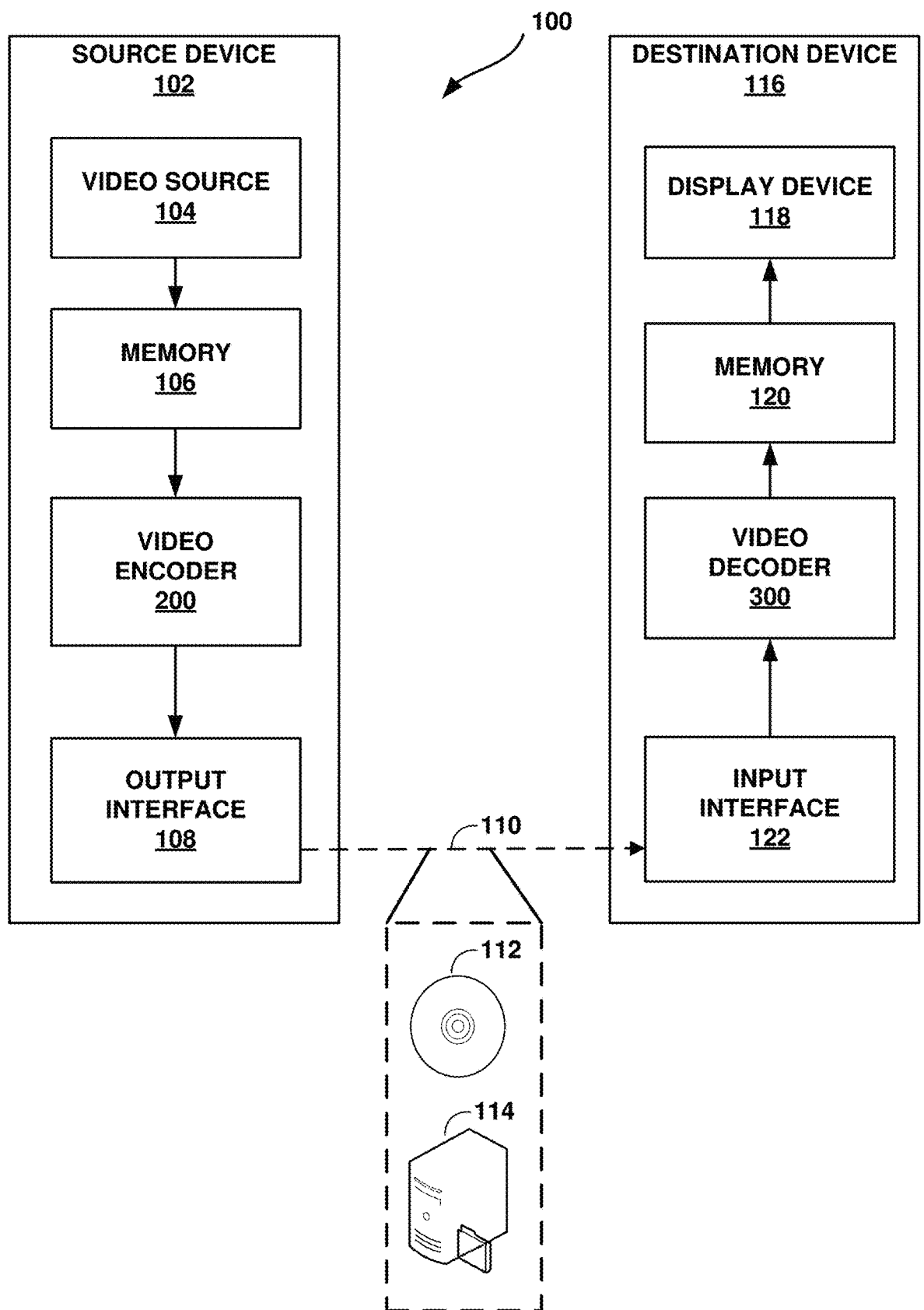
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, uncoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110.

Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for video coding with bilateral filtering as disclosed herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for video coding using bilateral filtering as disclosed herein. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, uncoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 116. Similarly, destination device 116 may access encoded data from storage device 116 via input interface 122. Storage device 116 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as the Joint Exploration Test Model (JEM) or ITU-T H.266, also referred to as Versatile Video Coding (VVC). A recent draft of the VVC standard is described in Bross, et al. "Versatile Video Coding (Draft 3)," Joint Video Experts Team (JVET) of ITU-T SG 16 WP 3 and ISO/IEC JTC 1/SC 29/WG 11, 12$^{th}$ Meeting: Macao, CN, 3-12 Oct. 2018, JVET-L1001-v9 (hereinafter "VVC Draft 3). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to JEM or VVC. According to JEM or VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16) Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of JEM and VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of JEM and VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing filtering processes such as a deblocking process to reduce visual artifacts along boundaries of the block. In some embodiments, video decoder 300 may perform bilateral filtering in accordance with various embodiments disclosed herein.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
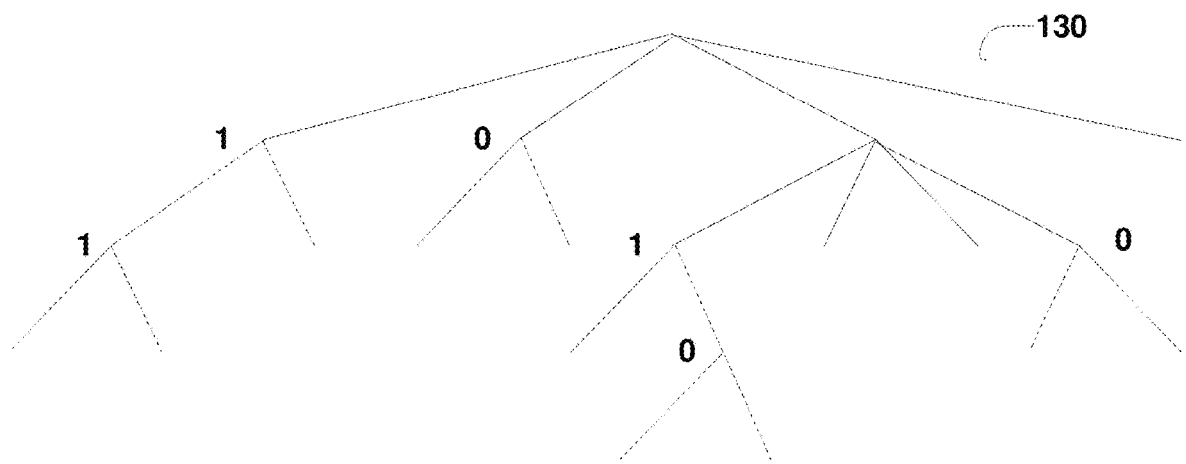
FIGS. 2A and 2B are conceptual diagrams illustrating an example quadtree binary tree (QTBT) structure, and a corresponding coding tree unit (CTU).
Figure 2B:
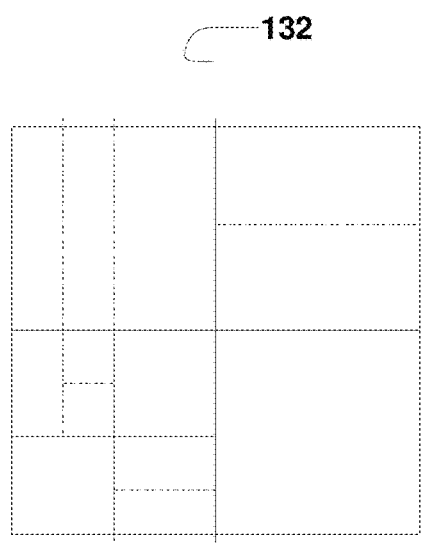

FIGS. 2A and 2B are conceptual diagram illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
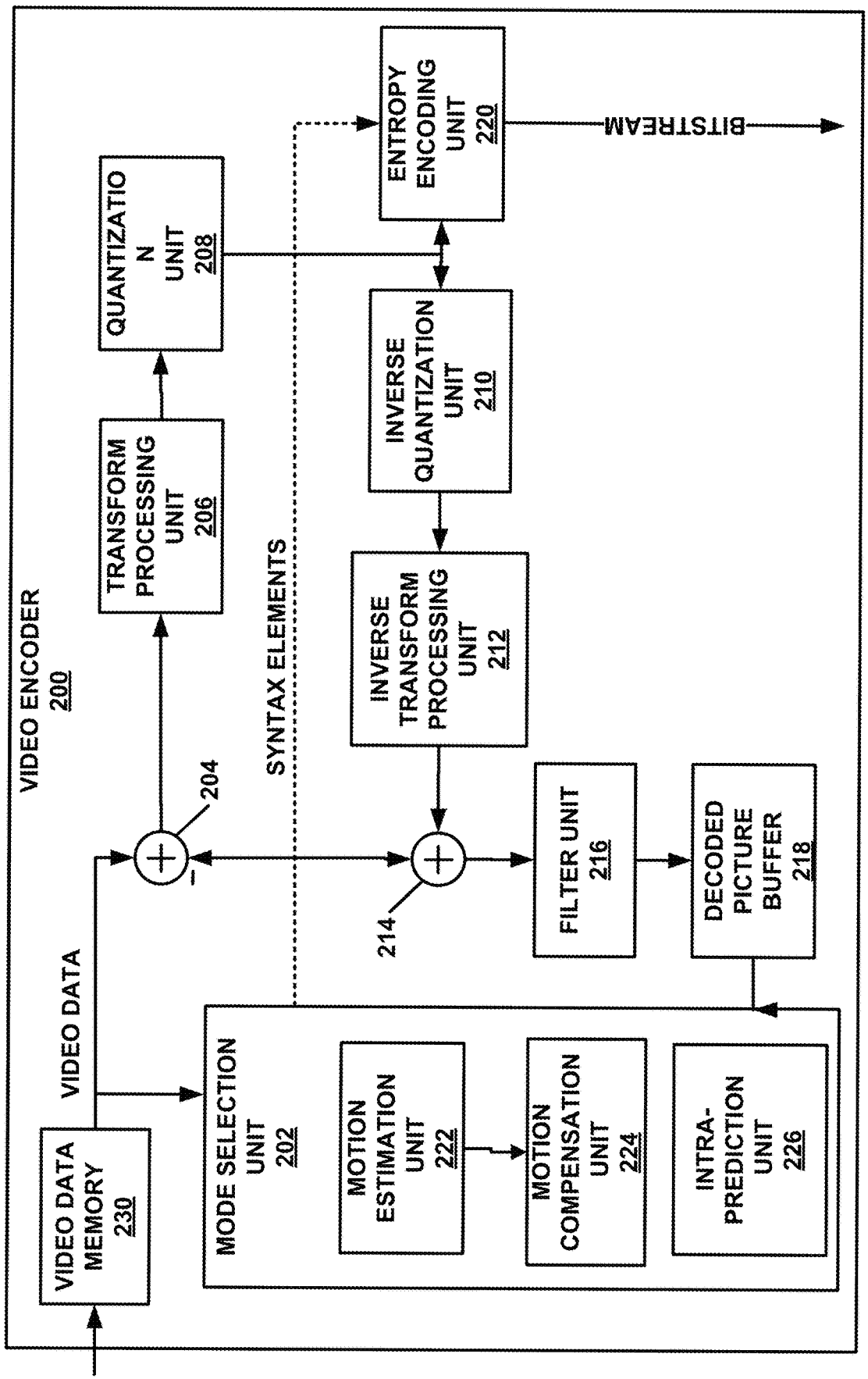
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, uncoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 120 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples. In some embodiments, filter unit 216 may also be configured to perform bilateral filtering in accordance with embodiments disclosed herein.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Generally, embodiments accordingly to the present application include the filter unit 216 as a coding tool in the encoder 200. However, embodiments may include bilateral filters according to embodiments herein that are applied as post decoding filters. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to encode video data using bilateral weighting functions as disclosed herein.

Figure 4:
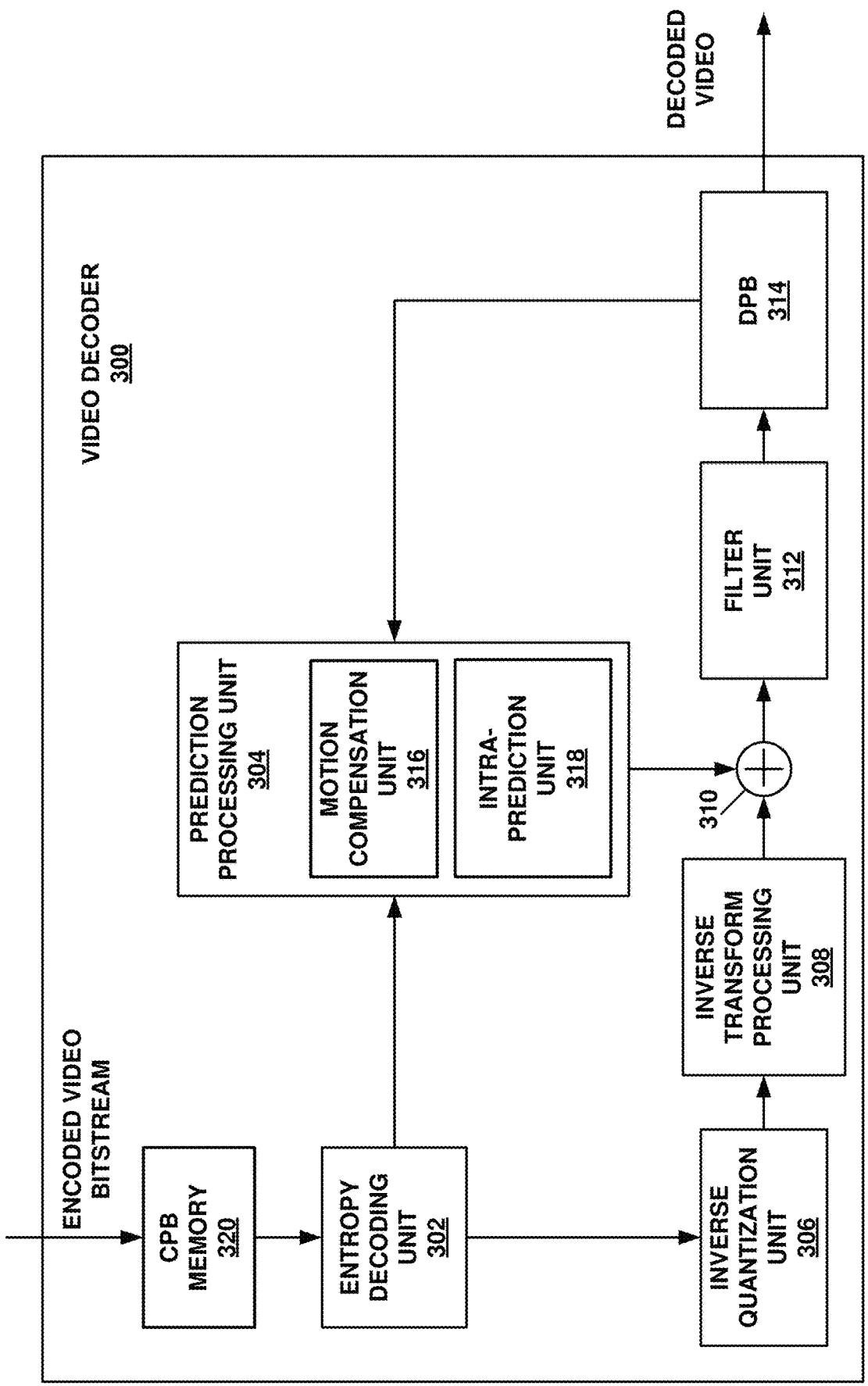
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of JEM, VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples. In some embodiments, filter unit 312 may also be configured to perform bilateral filtering in accordance with embodiments disclosed herein. In other embodiments, a filter unit (not shown) may perform bilateral filtering as part of a post-processing process.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured encode video data using bilateral weighting functions as disclosed herein.

As noted above, the filter unit 216 of video encoder 200 and filter unit 312 of video decoder 300 (along with any other unit performing post or in-loop processing filtering processes) may employ bilateral filtering.

Forms of bilateral filtering has been proposed to avoid undesirable over-smoothing for pixels in the edge. Bilateral filtering includes weighting of neighboring samples that takes the pixel values themselves into account to weight more those pixels with similar luminance or chrominance values. A sample located at (i,j), will be filtered using its neighboring sample (k,l). The weight $\omega(i,j,k,l)$ is the weight assigned for sample (k,l) to filter the sample (i,j), and it is defined as:

$$\omega(i, j, k, l) = e^{\left(-\frac{(i-k)^2+(j-l)^2}{2\sigma_d^2} - \frac{\|I(i,j)-I(k,l)\|^2}{2\sigma_r^2}\right)} \quad (1)$$

I(i,j) and I(k,l) are the intensity value of samples (i,j) and (k,l) respectively. $\sigma_d$ is the spatial parameter, and $\sigma_r$ is the range parameter. The filtering process with the filtered sample value denoted by $I_D(i,j)$ could be defined as:

$$I_D(i, j) = \frac{\sum_{k,l} I(k, l) * \omega(i, j, k, l)}{\sum_{k,l} \omega(i, j, k, l)} \quad (2)$$

In some examples of bilateral filtering, the properties (or strength) of the bilateral filter may be controlled by these two parameters. Samples located closer to the sample to be filtered, and samples having smaller intensity difference to the sample to be filtered, will have larger weight than samples further away and with larger intensity difference.

Figure 5:
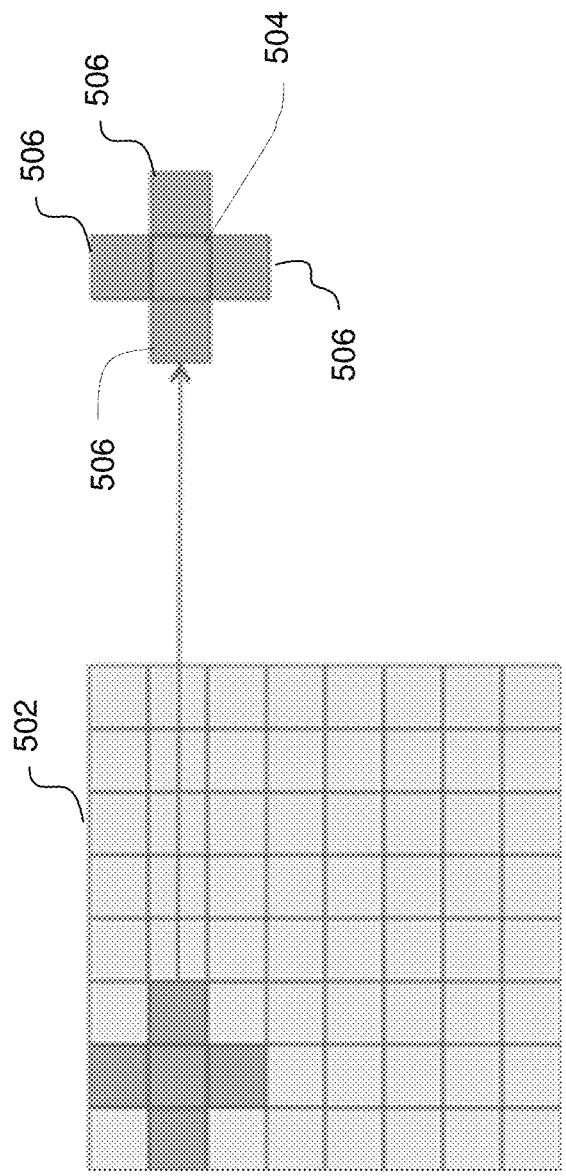
FIG. 5 is a conceptual diagram illustrating a sample of a transform unit and its neighboring four samples utilized in a bilateral filtering process.

FIG. 5 is a conceptual diagram illustrating one sample 504 of a transform unit 502 and four neighboring samples 506 utilized in a bilateral filtering process. In such examples, each reconstructed sample in the transform unit (TU) is filtered using its direct neighboring reconstructed samples only. The filter has a plus sign shaped filter aperture defined by neighboring samples 506 that is centered at the sample 504 to be filtered. Parameter $\sigma_d$ may be set based on the transform unit size (on example is shown in Equation 3), and parameter $\sigma_r$ may be set based on the QP used for the current block (one example is shown in Equation 4).

$$\sigma_d = 0.92 - \frac{\min(TU \text{ block width}, TU \text{ block height})}{40} \quad (3)$$

-continued $$\sigma_r = \max\left(\frac{(QP-17)}{2}, 0.01\right) \quad (4)$$

It has been previously proposed that to further reduce the coding loss under low delay configuration, the filter strength is further designed to be dependent on the coded mode. See, J. Ström, P. Wennersten, K. Andersson, J. Enhorn, "Bilateral filter strength based on prediction mode", JVET-E0032, 5th Meeting: Geneva, CH, 12-20 Jan. 2017. For intra-coded blocks, the above equation (3) is still used. While for inter-coded blocks, the following equation is applied.

$$\sigma_d = 0.72 - \frac{\min(TU\ \text{block width}, TU\ \text{block height})}{40} \quad (5)$$

The different values for $\sigma_d$ indicates that filter strength for inter prediction blocks is relatively weaker compared to that of intra prediction blocks. Inter predicted blocks typically have less residual than intra predicted blocks and therefore the bilateral filter may be designed to filter the reconstruction of inter predicted blocks less. Calculating the output filtered sample value $I_D(i,j)$ may include calculating:

$$I_F(i,j) = \frac{\sum_{k,l} I(k,l) * \omega(i,j,k,l)}{\sum_{k,l} \omega(i,j,k,l)} \quad (6)$$

Due to the fact that the filter only touches the sample and its 4-neighbours, this equation can be written as:

$$I_F = \frac{I_C\omega_C + I_L\omega_L + I_R\omega_R + I_A\omega_A + I_B\omega_B}{\omega_C + \omega_L + \omega_R + \omega_A + \omega_B} \quad (7)$$

where $I_C$ is the intensity of the center sample, and $I_L$, $I_R$, $I_A$ and $I_B$ are the intensities for the left, right, above and below samples, respectively. Likewise, $\omega_C$ is the weight for the center sample, and $\omega_L$, $\omega_R$, $\omega_A$ and $\omega_B$ are the corresponding weights for the neighbouring samples. This filter only uses samples within the block for filtering—weights outside are set to 0.

In order to reduce the number of calculations, the bilateral filter in the JEM has been implemented using a look-up-table (LUT). For every QP, there is a one-dimensional LUT for the values $\omega_L$, $\omega_R$, $\omega_A$ and $\omega_B$ where the value:

$$\omega_{other} = \text{round}\left(65 * e^{\left(-\frac{1}{2*0.82^2} - \frac{\|I-I_C\|^2}{2\sigma_r^2}\right)}\right) \quad (8)$$

is stored, where $\sigma_r^2$ is calculated from (4) depending upon QP. Since $\sigma_d$=0.92-4/40=0.82 in the LUT, it can be used directly for the intra M×N with minimum (M, N) equal to 4 case with a center weight $\omega_C$ of 65, which represents 1.0. For the other modes (i.e., intra M×N but minimum (M, N) unequal to 4, inter K×L blocks), the process may use the same LUT, but instead use a center weight of:

$$\omega_C = \text{round}\left(65 * \frac{e^{-\frac{1}{2*0.82^2}}}{e^{-\frac{1}{2*\sigma_d^2}}}\right), \quad (9)$$

where $\sigma_d$ is obtained by (3) or (5). The final filtered value may be calculated using:

$$I_F = \text{floor}\left(\frac{\begin{array}{c}I_C\omega_C + I_L\omega_L + I_R\omega_R + I_A\omega_A + \\ I_B\omega_B + ((\omega_C + \omega_L + \omega_R + \omega_A + \omega_B) \gg 1)\end{array}}{\omega_C + \omega_L + \omega_R + \omega_A + \omega_B}\right) \quad (10)$$

where the division used is integer division and the term $(\omega_C+\omega_L+\omega_R+\omega_A+\omega_B)\gg 1$ is added to get correct rounding.

In the JEM reference software, the division operation in Equation 10 is replaced by a look-up table (LUT), along with multiplication and shift operations. To reduce the size of the numerator and denominator, Equation 10 is further refined to $$I_F = I_C + \frac{\omega_L(I_L - I_C) + \omega_R(I_R - I_C) + \omega_A(I_A - I_C) + \omega_B(I_B - I_C)}{\omega_C + \omega_L + \omega_R + \omega_A + \omega_B} \quad (11)$$

In the JEM reference software, Equation 11 is implemented in a way that the division could be implemented by two look-up tables, and (11) could be rewritten as:

$I_F=I_C$+sign(PixelDeltaSum)*((sign(PixelDeltaSum)
*PixelDeltaSum+o)*LUT(sumWeights)>>(14+
DivShift(sumWeights))) (12)

wherein:

PixelDeltaSum=($\omega_L(I_L-I_C)+\omega_R(I_R-I_C)+\omega_A(I_A-I_C)+\omega_B(I_B-I_C)$)

sumWeights=$\omega_C+\omega_L+\omega_R+\omega_A+\omega_B$ o=PixelDeltaSum+sign(PixelDeltaSum)

sign(x)=x>=0?1:-1;

The two look-up tables are the look-up table LUT to get an approximated value for each 1/x (x is an positive integer value) after shifting, and a look-up table DivShift to define the additional shift value for input x. See, J. Ström, P. Wennersten, K. Andersson, J. Enhorn, "EE2-JVET related: Division-free bilateral filter", JVET-F0096, 6th Meeting: Hobart, CH, 31 Mar.-7 Apr. 2017. The filter may be turned off if QP<18 or if the block is of inter type and the block dimensions are 16×16 or larger.

It is noted that the proposed bilateral filtering method is only applied to luma blocks with at least one non-zero coefficients. For chroma blocks and luma blocks with all zero coefficients, the bilateral filtering method is always disabled.

Figure 6:
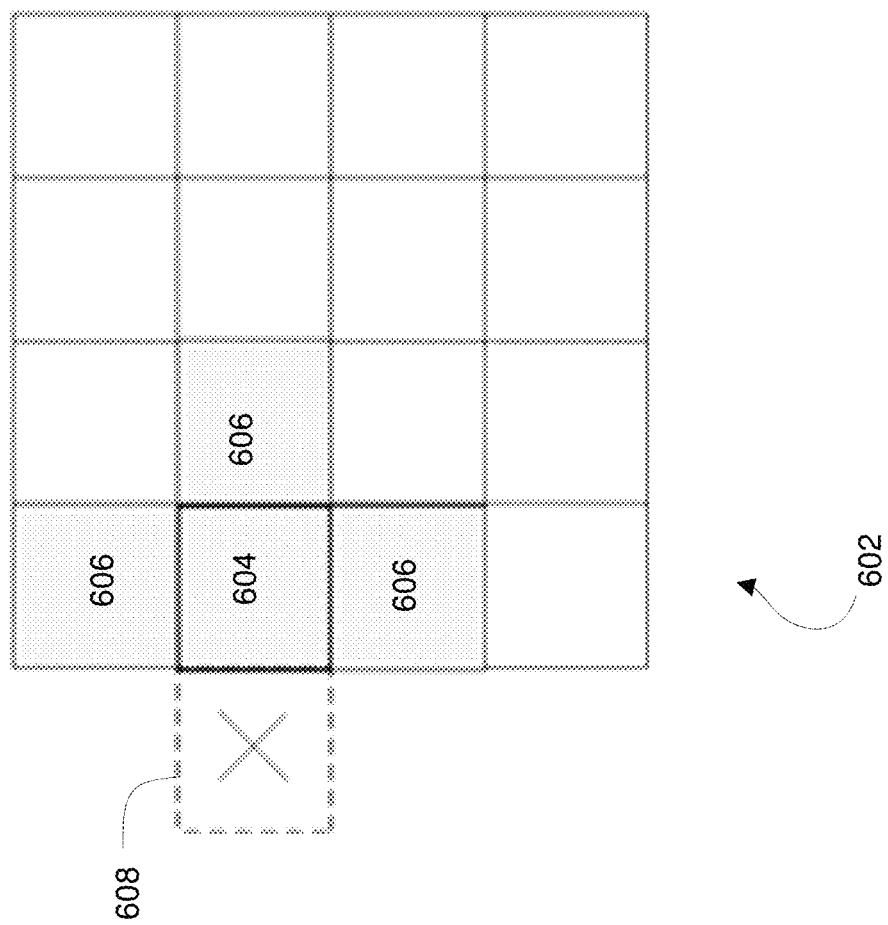
FIG. 6 is a diagram illustrating a transform including a sample and its neighboring four samples utilized in bilateral filtering process.

FIG. 6 is a diagram illustrating a transform block 602 including a sample 606 and its neighboring four samples 606 utilized in bilateral filtering process. For samples located at a TU top and left boundaries (i.e., top row and left column), only neighboring samples within current TU are used to filter current sample. As shown in FIG. 6, the left neighboring block 608 is not used filter the pixel 602.

Another implementation of bilateral filter for video coding was proposed in JVET-K384 document. To address issues of bilateral filters of (X), which involves division and high precision multiplications, a division-free bilateral filtering was proposed in JVET-K384 document. The equation for filtered sample $I_F$ was stated as following:

$$I_F = I_C + \Sigma_{i=1}^{N} w_i^*(I_i - I_c) \tag{13}$$

where $I_C$ is the intensity of the current sample and $I_F$ is the modified intensity of the current sample after performing DFBil, $I_i$ and $w_i$ are the intensity and weighting parameter for the m-th neighboring sample, respectively.

The weight w(x) associated with the k-th neighboring sample is defined as follows:

$$w_k(x) = Distance_k \times Range_k(x) \text{ where} \tag{14}$$

$$Distance_k = e^{\left(-\frac{10000}{2\sigma_d^2}\right)} / 1 + 4*e^{\left(-\frac{10000}{2\sigma_d^2}\right)}, \tag{15}$$

$$Range_k(x) = e^{\left(-\frac{x^2}{8*(QP-17)*(QP-17)}\right)} \tag{16}$$

In this proposal, the weighting factor $w_i$ may be represented by two parts, one part (denoted by $Dis_i$) to include the distance information between current sample and one neighboring sample, and the other part (denoted by $Rang_i$) to include the sample differences information, e.g. $w_i = Dis_i * Rang_i$. It was also proposed that $Rang_i$ may rely on the quantization parameter (QP) of the block covering current sample.

Figure 7:
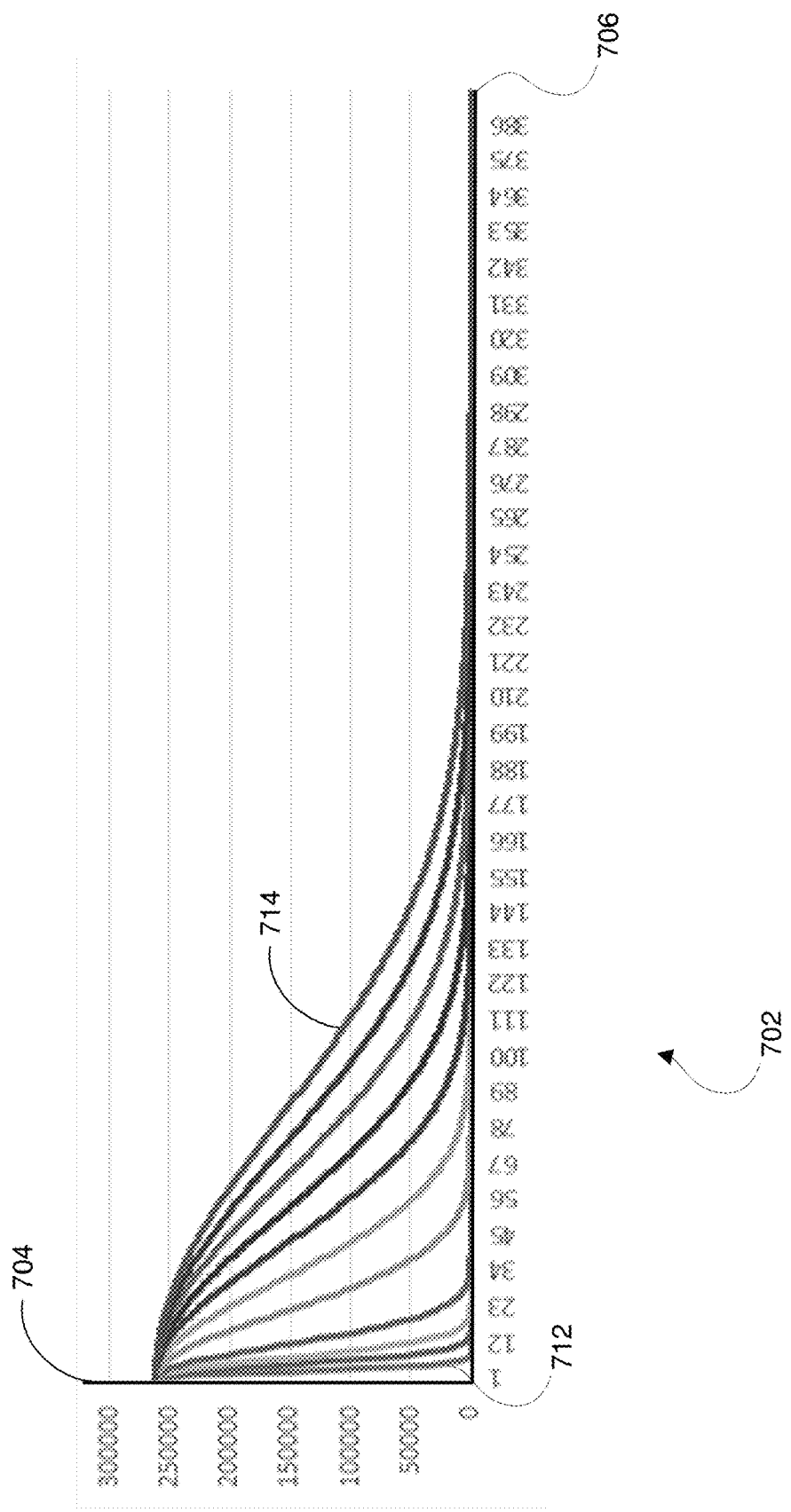
FIG. 7 is a graph illustrating examples of filter weight functions.

FIG. 7 is a graph 702 illustrating examples of filter weight functions (values along a vertical axis 704), shown as a function intensity difference (values along a horizontal axis 706). A series of lines plot a family of weight functions for different QP values ranging from 18 (line 712) to 52 (line 714) with lines between for QP values of 19, 20, 22, 25, 27, 32, 37, 42, and 47 in order between lines 712 and 714. Weights $w_i$, being computed as shown in Eq. (14-16) as function multiple parameters, such as QP, intensity difference, for the family of the weight functions as shown in FIG. 7. During the filtering process, QP of the current block is used to determine a particular weighting function and weight is derived by accessing the LUT with intensity differences.

The prior designs of bilateral filtering may have the following issues that would be desirable to address using embodiments as disclosed herein in future video codecs based on, or including similar related coding tools to, HEVC or the JEM models.

For example, Direct implementation of bilateral filter for each sample as in Equation 12, 13 can be considered too high for real time implementations and practical implementations are likely to rely on the precomputed weight functions in form of Look Up Tables (LUT). These LUT can be a function of intensity differences, QP and distance, thus, would require a significant memory size. Example of such use case is the claimed memory requirements in document JVET-K384, where the total number of values in the LUT equals the total number of products $W_k(x) = Distance_k \times Range_k(x)$, which is 28795. Each of these values has 18 bits precision. This is an example when complexity is being traded for memory requirements. However, the memory requirements may be considered impractical.

Another issue associated with currently proposed bilateral filter design, is not utilization of a priori knowledge on statistics of quantization error distribution within a reconstructed block.

Figure 8:
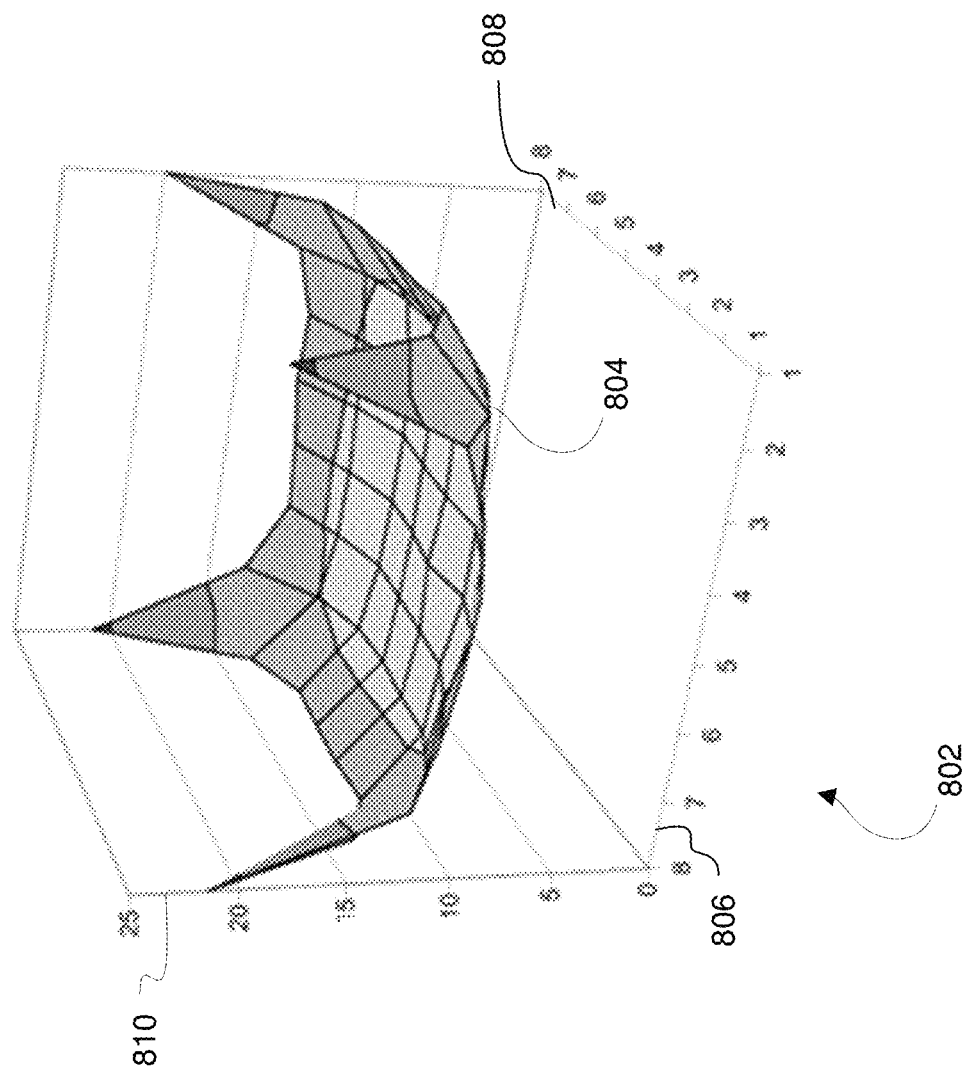
FIG. 8 is a surface plot illustrating an example spatial distribution of the variance of the quantization error within a block.

FIG. 8 is a 3d surface plot 802 illustrating an example spatial distribution 804 of the variance of the quantization error within a block of size 8×8 processed with uniform quantization in the DCT domain relative to row and column position. In FIG. 8, the axis 806 corresponds to rows, the axis 808 corresponds to columns, and the axis 810 corresponds to mean square error. A block-based video coding approach commonly results in so called blocking artifacts, which are characterized by significantly higher quantization error at the samples located at the boundaries of the block, as shown in FIG. 8. However, this a priori information is not being used in Eq. 12 or 13.

Yet another issue that may occur for bilateral filtering for video coding is that reasonable performance is likely to feature use of a family of the weighting functions suitable for different coding modes, QP values, and statistics of the signal. Current implementation of these filters results in tabulation of a large number of functions to address these modes. This large number of functions may lead to a significant memory increase and thus in limitation of bilateral filter adaptivity. To address some or all of these problems, embodiments may utilize one or more features of the embodiments described below.

In some embodiments, the weighing function w(x) of a bilateral filter is defined by a limited set of parameters {Si} (smaller number if parameters than length of the LUT) defining and a derivation process converting said parameters to entries of LUT (function value). In some embodiments, the function can be defined through an analytical parametric function, including linear, higher order, or piece-wise models. In some such embodiments, a piece-wise defined parametric model of w(x) can employ partitioning of the x value into explicitly define number of ranges, their size, equal range or exponentially ordered ranges. In some such embodiments, the number of ranges and model parameters can be derived as a function of the QP of the block, parameters of block partitioning, including sizes, shape, or statistics of the signal.

In some embodiments, a derivation process involving reconstruction of the w(x) may be implemented in form of constructing a complete or relevant part of the w(x) function, which is latter passed to the bilateral filter module of the encoder 200 or decoder 300. In some embodiments, the weighting function may be implemented w(x) at the sample level through a specified derivation mechanism. Parameters of w(x) function may optionally be made available to the decoder 300 as a side information or derived from the processed signal or derived from the syntax elements of the decoded bitstream.

In some embodiments, Weighting function w(x) associated with the k-th neighboring sample is adjusted by a reliability cost $Reliability_k(x)$ associated with the spatial location (within a current block) of the sample k:

$$W_k(x) = Distance_k \times Range_k(x) \times Reliability_k(x) \tag{17}$$

In some embodiments, reliability cost value is derived from a set of {Reliability (x)} values as function of relative spatial location of the processed sample k within processed block. For example, {Reliability (x)} function for current block may be defined as a 2D function or product of 1D functions that is based on consideration of one or more of block sizes, coding modes, transform type, or QP parameters of the blocks to which k filter belongs. Optionally, Reliability(x) function can be defined through a parametric model with a specified function reconstruction method, e.g. Linear, higher order interpolation. Alternatively, the Reliability function can be made available to decoder as a side information or derived from syntax elements of the decoded bitstream.

In some embodiments, the Reliability (x) function may be defined as an adaptive function, with parameter signaling. In different examples, the parameters or identification of weight function w(x) and or Reliability(x) function may be signaled at the sequence/picture/slice level or signaled per unit, such as LCU/CU/quadtree partitions.

In some embodiments, a family of bilateral weighing functions {w(x,QP,Mode)} is constructed from a set of parameters {Si} that define the basic weighting function w(x). Construction of the family functions {w(x,QP,Mode)} may be conducted using a specified derivation process, where QP is a quantization parameter and Mode is an identifier of a coding mode, e.g. intra/inter, parameters of block partitioning, transform parameters, or some other coding parameters.

In some embodiments, the basic weighting function w(x) can be optimal for a specific QP value, e.g. QP0. Following the construction of the basic w(x) function, the said derivation process is applied to attenuate the weighting function w(x,QP,Mode) for a particular set of coding parameters, e.g. QP value, Coding Mode.

In some embodiments, a set of parameters {Si} defining basic weighting function w(x) can include a set of pivot points defining w(x) function at a subsampling rate. In yet another embodiment, the set of parameters can include parameters of piecewise linear model used to approximate the basis function, e.g. set of Ri ranges of values x and a set of scale values $s_i$ which is applied to a range Ri to approximate the w(x).

In some embodiments, the derivation process for constructing bilateral weighing function {w(x,QP,Mode)} from the parameters of a basic function w(x) may include derivation of the scale value $s_i$(QP, Mode) from a scale value $s_i$ of the basic function through linear operations such as scaling and offset. In some embodiments, the derivation process may include interpolation of the intermediate samples from given pivot point. In some such embodiments, adjustment may include changing the number of intermediate samples which are interpolated, thus attenuating the length of the w(x).

As defined above, the filtering process could be represented by:

$$I_F = I_C + \Sigma_{i=1}^{N} w(x) * (I_i - I_c) \quad (18)$$

Function w(x) can be defined as a piece-wise linear function through a group of non-overlapped dynamic range partitions (ranges) {Ri} of input value x, were i is an index of the range with range of 0 to N−1, inclusive, and where N is the total number of ranges {Ri} utilized for defining w(x) function. For each of these {Ri}, w(x) function can be defined through a linear model described by a scale $S_i$ and offset $O_i$ which are applied to every $x \in [x_i, x_{i+1}-1]$, thus $w(x) = \{S_i, O_i\}$.

In some embodiments, a family of bilateral weighing function {w(x,QP,Mode)} is further constructed by introducing function-dependent constraints on the entry values of weighting function w(x,QP,Mode), such that higher performance or lower complexity implementation can be achieved. Alternatively, the function derivation algorithm can be made adaptive to particular characteristics of the function, e.g. can be made adaptive to values of QP and/or Mode values or additional syntax element derived from the bitstream.

In some embodiments, the adaptivity of function derivation process can be implemented by adjusting number of ranges for piece-wise model utilized for function approximation, or by adjusting beginning/end of the utilized ranges. In some embodiments, beginning/end of ranges can be set equal to power of 2, to reduce computational complexity of implementation, thus replacing multiplicators with operations of arithmetic shifts. In some embodiments, parameters of A constrained piece-wise model (number ranges, beginning/end values for ranges) or constraints imposed on the function are derived from the function characteristics, e.g. maximum/minimum values of the function and/or position of the function value meting some threshold value(s).

Figure 9:
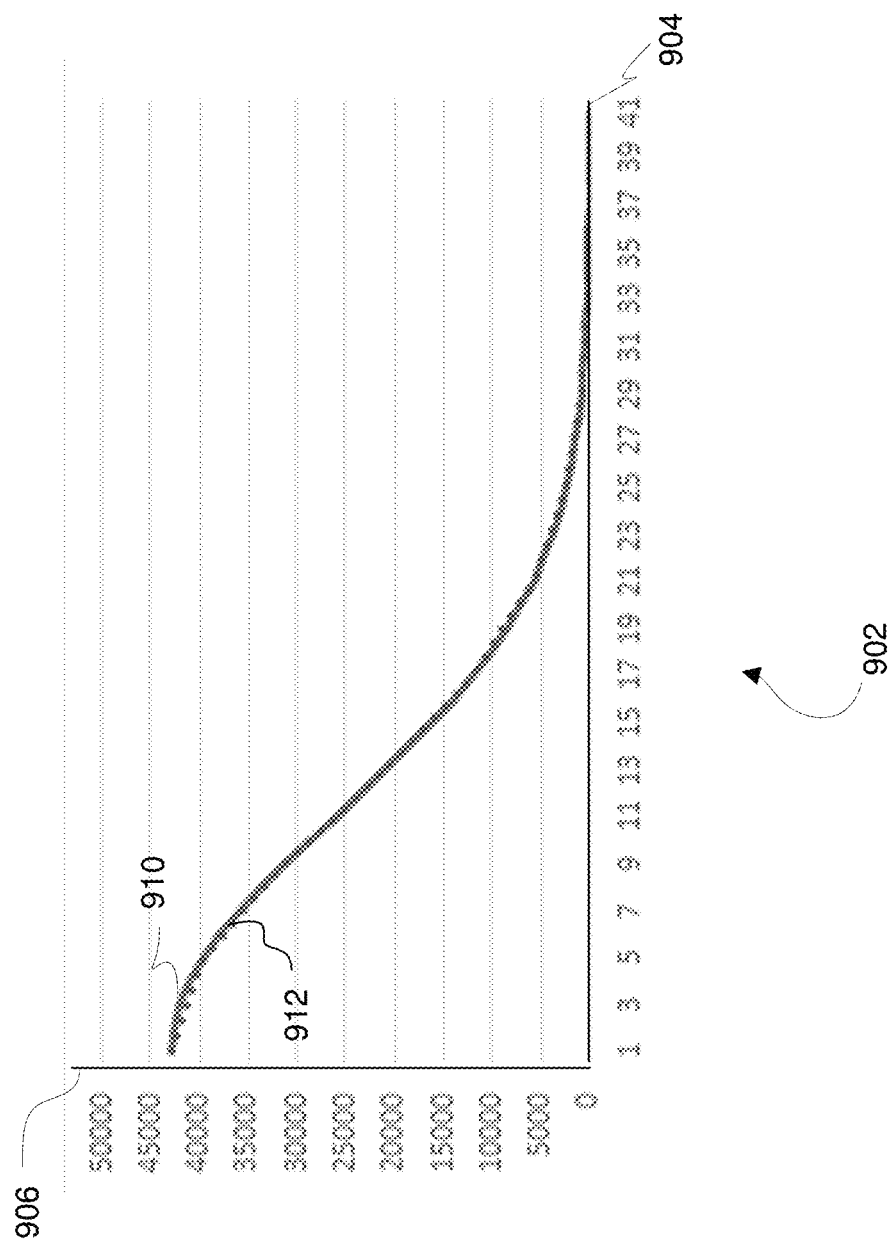
FIG. 9 is a graphical illustration of an example of a piece-wise linear function and a reference function.

FIG. 9 is a graphical illustration of an example of a piece-wise linear function 912 and a reference function 910 illustrated via spatial distribution of the variance of the quantization error within a block 8×8 processed with uniform quantization in the DCT domain. The graph 902 shows the close tracking of the two representations (piece-wise 912 (dotted line) and reference function 910 (solid line)).

According to some embodiments, a LUT construction process can be implemented as follows: Let's assume w(x) function having a length identified as wLength is defined through N ranges size of delta, with {Si} defining parameter of linear model in the i range. Function x(x) can be derived via the following pseudo code:

```
w [0] = INIT_VALUE;
i=0;
for (x = delta; x <= wLength; x+=delta, i++)
    {
    int64_t point1 = w[x−delta];
    int64_t point2 = w[x];
    for (j = x−delta; j < x; j++)
        {
        value = (int64_t)(point1 + S * (j − (x − delta)) + 0.5);
        w[j] = value;
        }
    }
```

In yet another embodiment, w(x) function can defined through N ranges identified by the pivot points {Pi}. In some embodiments, w(x) function can defined through N ranges of variable size, with size of the ranges following exponent, e.g. Lengths={1, 2, 4, 8 . . . }. In some embodiments, parameters of model can be derived from processing block parameters, such as QP value, block size or coding mode.

According to another example, and based on the examples as defined above, the filtering process may use a weighting function w(x) associated with the k-th neighboring sample is adjusted by a reliability cost Reliability$_k$(x) associated with the spatial location (within a current block) of the sample k:

$$W_k(x) = \text{Distance}_k \times \text{Range}_k(x) \times \text{Reliability}_k(x) \quad (19)$$

In some embodiments, the sample Reliability function can be derived as inverse of spatial distribution of quantization error variance 804 for a coded block, such as shown in FIG. 8. The Reliability function may be utilized at the bilateral filter to calculate the weight with which current sample(s) participate in filtering.

Generally, 2D function Reliability(x) can be decomposed due to its symmetry properties and parametrized to a limited set of parameters according to selected model. Parameters of such a model can be provided to decoder 300 by the encoder 200 either as a side information or derived from the syntax elements of the bitstream.

In some embodiments, the derivation process for constructing bilateral weighing function {w(x,QP,Mode)} from the parameters of basic function w(x) may include interpolation of the intermediate samples from given pivot points.

The pivot points may, for example, be predefined for each QP and Mode only. Adjustment can include change in the number of intermediate interpolated values between pivot points according, thus attenuating the total length of the w(x) and characteristics of this function.

In some embodiments, the derivation process for constructing bilateral weighing function {w(x,QP,Mode)} may include placement of intermediate points which number is derived from QP parameters, e.g., equal to QP parameter minus some predefined constant value.

In some embodiments, the derivation process for constructing bilateral weighing function {w(x,QP,Mode)} may include derivation of pivot points for every Mode by multiplication predefined pivot points for only one Mode on predefined integer values and then right shifting by predefined number of bits. This may include adjusting predefined number of pivot points.

In some embodiments, the derivation process for constructing bilateral weighing function {w(x,QP,Mode)} may include all predefined values being implemented in fixed point arithmetic, e.g. with 16-bit unsigned integer numbers.

Below is a non-restrictive example of one implementation of a {w(x,QP,Mode)} derivation process. In this example, the family of weighting functions are stored in sigmaDistTab [qpIdx][k][count] variable which is implementation of said {w(x,QP,Mode)} weighting function. Illustrative Pseudo code:

```
const uint16_t gen_pivot[11] =
{
    42950, 37903, 26050, 13944, 5813, 1887, 477, 94, 14, 2, 0
};
constexpr int SHIFT_DIST = 15;
const uint16_t sc[5] = { 30195, 19316, 26068, 19316, 1470 };
//starting from second
constexpr int SHIFT_NUM = 17;
const uint16_t num[45] = {   65535,   43690, 32768, 26214, 21845, 18724, 16384, 14563, 13107,
                             11915,   10922, 10082, 9362, 8738, 8192, 7710, 7281, 6898,
                             6553,    6241, 5957, 5698, 5461, 5242, 5041, 4854, 4681,
                             4519,    4369, 4228, 4096, 3971, 3855, 3744, 3640, 3542,
                             3449,    3360, 3276, 3196, 3120, 3048, 2978, 2912, 2849 };
//linear interpolation via pivots on uniform mesh
for (int qp = MIN_QP_BILATERAL_PLUS1; qp < MAX_QP + 1; qp++)
{
  int qpIdx = qp - MIN_QP_BILATERAL_PLUS1;
  int step = qpIdx + 1;
  for (int k = 0; k < TYPE_NUM_BILATERAL; k++)
  {
    int count = 0;
    uint16_t pivot[11];
    if( k == 0 )
    {
      for(int i = 0; i < 11; i++ )
        pivot[i] = gen_pivot[i];
    }
    else
    {
      for(int i = 0; i < 11; i++ )
        pivot[i] = (gen_pivot[i]*sc[k-1]) >> SHIFT_DIST;
    }
    for (int j = 0; j < 10; j++) {
      int d;
      if( qpIdx == 0)
        d = (pivot[j + 1] - pivot[j]);
      else
        d = ((pivot[j + 1] - pivot[j])*num[qpIdx - 1]) >> SHIFT_NUM;
      for (int i = 0; i < step; i++)
      {
        uint16_t value = std::max((int)pivot[j + 1], pivot[j] + i * d);
        sigmaDistTab[qpIdx][k][count] = value;
        count++;
      }
    }
  }
}
```

In yet another example embodiment, the following example implementation may be utilized:

```
            basicFun = {S_0, S_1...S_{N-1}};
    step = function(QP);
            sigmaDistTab[0] = INIT_VALUE;
    count = 1;
```

-continued

```
    for (int j = 0; j < N; j++) {
      local_scale = basicFun [j] * Attenuate(QP) >> shift_value;
      for (int i = 0; i < step; i++)
      {
        uint16_t value = sigmaDistTab [count--] + local_scale);
        sigmaDistTab[count] = value;
```

-continued

```
            count++;
        }
    }
}
```

In some embodiments, the derivation process for weights may include a computation of a difference of x and some predefined value, which may be treated as a right end of the range R_j on which weighting function w(x,QP,Mode) is greater than zero, and subsequent multiplication by an integer number k which is dependent on values of QP and Mode only. In some embodiments, the derivation process for weights may include a computation of a difference of x and some predefined or derived value $x_m$, which may be treated as a right end of the range Rj including values $\{x_i, \ldots, x_{i+1}\}$, taken from predefined look up table LUT=$\{w_0, \ldots, w_N\}$ which determines mapping of ranges of integer values w(x,QP,Mode) for different ranges of integer values of x X=$\{x_0, \ldots, x_N\}$, and subsequent multiplication by a number k which is derived from the said look up table and is dependent on values of x and QP. In some embodiments, the absolute value integer number k, which is derived from the said look up table may be less than absolute value of $(w_i-w_{i+1})/(x_i-x_{i+1})$ for one subset of regions and greater than or equal to absolute value of $(w_i-w_{i+1})/(x_i-x_{i+1})$ for other regions.

In some embodiments, the look up table LUT may comprise N+1 values where N=$2^M$ is equal to some positive integer power of two. In some embodiments, computation of appropriate range i in said look up table LUT for said value x may be implemented as bitwise right arithmetical shift by predefined number of bits.

In some embodiments and some implementation, the bilateral filtering can be implemented without usage of LUT that stores the weight function for every possible input x value. Instead, the weight function can be derived for each input value x independently from significantly reduced set of parameters of weight function, which may reduced memory requirements. In one implementation, the weight function W length of N is represented with its pivot points set {Wpp} size of M, where M<N or scale values set {scalesD} size of M−1 and range boundaries {r} size of M−1, with r being equal to x marking the boundary of the range R. With this, some implementations and for some cases, LUT construction for W function can be avoided, and weight value can be computed for each x value independently as shown in the following pseudo-code:

idx1=abs(x)/r;
    idx2=abs(x) % r;
    weightValue=std::max(0, Wpp[idx1]+scaleD[idx2]*idx2);

In some implementation, size of the set {r} can be reduced to a single entry, M=1, and r value can be made a power of 2, such that value r can be represented by topShift value: topShift=log 2(r). In such implementations, the following derivation of weight W(x) for input parameter x may be used:

int idxJ=1<<topShift;
    idx1=abs(x)>>topShift;
    idx2=abs(x)−idx1;
    weightValue=std::max(0, Wpp[idx1]+scaleD[idx2]*idx2);

Particular embodiments may include features of the above embodiments in any suitable combination. For example, in one embodiment, the bilateral filter is defined in terms of a parameterized piece-wise function that maps ranges of w(x) weighting values. The mapping may be via a set of pivot points that are stored in a table indexed by a value associated with the range. For example, the w(x) may be right shifted as part of deriving the associated table entry. The mapping may be further dependent on one or both of the coding mode and the quantization parameter associated with the transform block. A weighting value may be derived for each neighbor sample from the table of pivot points in accordance with any of the examples above.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
reconstructing a transform block of the video data; and
applying a bilateral filter to a sample of the transform block using one or more neighboring samples, each of the one or more neighboring samples having a respective spatial location in the block, comprising, for each respective one of the one or more neighboring samples:
determining a difference value between the sample and each respective one of the one or more neighboring samples;
determining one of a plurality of value ranges for each respective one of the one or more neighboring samples based on the difference value for each respective one of the neighboring samples;
determining one of a plurality of weighting parameters for each respective one of the one or more neighboring samples based on the one of the plurality of value ranges for each of the one or more neighboring samples and further based on the respective relative spatial location within the transform block of each respective one of the one or more neighboring samples;
generating a weight for each respective one of the one or more neighboring samples, based on the difference value between the sample and the respective one of the neighboring samples, the determined weighting parameter, a quantization parameter associated with the transform block, and a coding mode associated with the transform block; and
applying the bilateral filter to the sample based on the one of the plurality of weights generated for each respective one of the one or more neighboring samples.

2. The method of claim 1, wherein the plurality of weighting parameters comprises side information that is not included in the video data.

3. The method of claim 1, wherein the one or both of the beginning or ending value of each of the value ranges is a value that is a power of 2.

4. The method of claim 1, wherein the plurality of weighting parameters comprise a plurality of pivot points defining a piece-wise linear weighting function for the bilateral filter.

5. The method of claim 4, wherein the plurality of pivot points is stored in a table of values indexed by the difference value.

6. The method of claim 5, further comprising storing a picture including the filtered transform block to a decoded picture buffer.

7. The method of claim 1, wherein coding comprises decoding the video data, the method further comprising:
decoding the video data from a video bitstream indicative of the coding mode, the quantization parameter, and the transform block; and
outputting a picture including the transform block for display.

8. The method of claim 1, wherein coding comprises encoding the video data, the method further comprising encoding the video data to a video bitstream indicative of the coding mode, the quantization parameter, and the transform block.

9. A device for coding video data, the device comprising:
a memory configured to store video data; and
one or more processors implemented in circuitry configured to:
reconstruct a transform block of the video data; and
apply a bilateral filter to a sample of the transform block using one or more neighboring samples, each of the one or more neighboring samples having a respective spatial location in the block, comprising, the one or more processors for each respective one of the one or more neighboring samples being further configured to:
determine a difference value between the sample and each respective one of the one or more neighboring samples;
determine one of a plurality of value ranges for each respective one of the one or more neighboring samples based on the difference value for each respective one of the neighboring samples;
determine one of a plurality of weighting parameters for each of the one or more neighboring samples based on the one of the plurality of value ranges for each of the one or more neighboring samples and further based on the respective relative spatial location within the transform block of each respective one of the one or more neighboring samples;
generate a weight for each respective one of the one or more neighboring samples, based on the difference value between the sample and the respective one of the neighboring samples, the determined weighting parameter, a quantization parameter associated with the transform block, and a coding mode associated with the transform block; and
apply the bilateral filter to the sample based on the one of the plurality of weights generated for each respective one of the one or more neighboring samples.

10. The device of claim 9, wherein the plurality of weighting parameters comprises side information stored in the memory.

11. The device of claim 9, wherein the one or both of the beginning or ending value of each of the value ranges is a value that is a power of 2.

12. The device of claim 9, wherein the plurality of weighting parameters comprise a plurality of a pivot points defining a piece-wise linear weighting function for the bilateral filter.

13. The device of claim 12, wherein the plurality of pivot points is stored in a table of values indexed by the difference value.

14. The device of claim 13, wherein the one or more processors is configured to store a picture including the filtered transform block to a decoded picture buffer in the memory.

15. The device of claim 9, wherein the device comprises a device for decoding the video data, the one or more processors further configured to:
  decode the video data from a video bitstream indicative of the coding mode, the quantization parameter, and the transform block; and
  output a picture including the transform block for display.

16. The device of claim 9, wherein the device comprises a device for encoding the video data, the one or more processors further configured to encode the video data to a video bitstream indicative of the coding mode, the quantization parameter, and the transform block.

17. The device of claim 9, further comprising a display configured to display a picture that includes the transform block.

18. The device of claim 9, further comprising a camera device configured to capture a picture that includes the transform block.

19. The device of claim 9, wherein the device comprises one or more of a camera, a computer, a mobile device, a broadcast receiver device, or a set-top box.

20. A non-transient computer-readable storage medium having stored thereon instructions that when executed cause the processor to:
  reconstruct a transform block of the video data; and
  apply a bilateral filter to a sample of the transform block using one or more neighboring samples, each of the one or more neighboring samples having a respective spatial location in the block, comprising, the one or more processors for each respective one of the one or more neighboring samples being further configured to:
    determine a difference value between the sample and each respective one of the one or more neighboring samples;
    determine one of a plurality of value ranges for each respective one of the one or more neighboring samples based on the difference value for each respective one of the neighboring samples;
    determine one of a plurality of weighting parameters for each of the one or more neighboring samples based on the one of the plurality of value ranges for each of the one or more neighboring samples and further based on the respective relative spatial location within the transform block of each respective one of the one or more neighboring samples;
    generate a weight for each respective one of the one or more neighboring samples, based on the difference value between the sample and the respective one of the neighboring samples, the determined weighting parameter, a quantization parameter associated with the transform block, and a coding mode associated with the transform block; and
    apply the bilateral filter to the sample based on the one of the plurality of weights generated for each respective one of the one or more neighboring samples.

* * * * *